Oct. 28, 1924.
C. O. JOHNSON
BREAD DISPENSING DEVICE
Filed Sept. 13, 1923 — 2 Sheets-Sheet 1
1,513,248
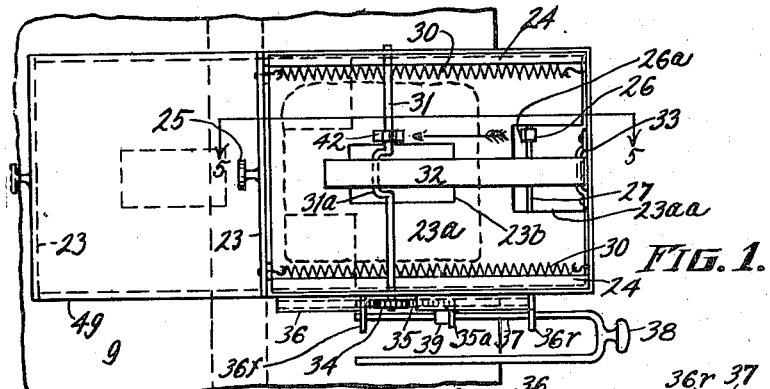
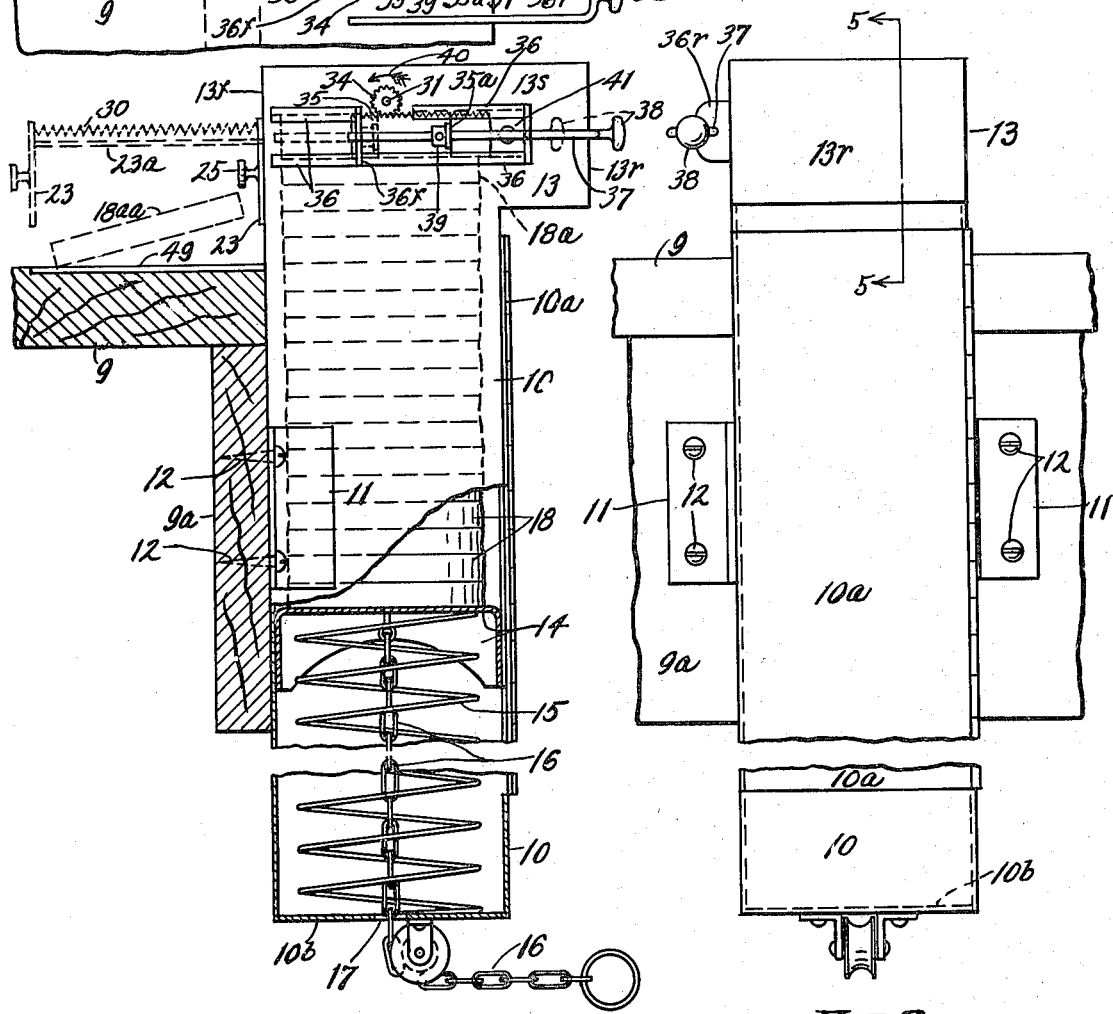
FIG. 1.  FIG. 2.  FIG. 3.
INVENTOR:
Carl O. Johnson
BY A. M. Carlsen
ATTORNEY.

Oct. 28, 1924.

1,513,248

C. O. JOHNSON

BREAD DISPENSING DEVICE

Filed Sept. 13, 1923   2 Sheets-Sheet 2

INVENTOR:
Carl O. Johnson
BY A. M. Carlsen
ATTORNEY.

Patented Oct. 28, 1924.

1,513,248

UNITED STATES PATENT OFFICE.

CARL O. JOHNSON, OF SOUTH ST. PAUL, MINNESOTA.

BREAD-DISPENSING DEVICE.

Application filed September 13, 1923. Serial No. 662,397.

*To all whom it may concern:*

Be it known that I, CARL O. JOHNSON, a citizen of the United States, residing at South St. Paul, in the county of Dakota and State of Minnesota, have invented certain new and useful Improvements in Bread-Dispensing Devices, of which the following is a specification.

My invention relates to bread dispensing devices particularly adapted for restaurants, lunch rooms and like places where bread is sold and served to customers or the customers help themselves to bread.

The object is to provide a device for dispensing a certain predetermined number of bread slices to each customer in such a manner that undesirable fingering and handling of bread is eliminated.

In the accompanying drawing:

Fig. 1 is a top view of my device and a portion of a lunch counter to which it is attached.

Fig. 2 is a side elevation of Fig. 1.

Fig. 3 is a rear end elevation of Fig. 2.

Figure 4:
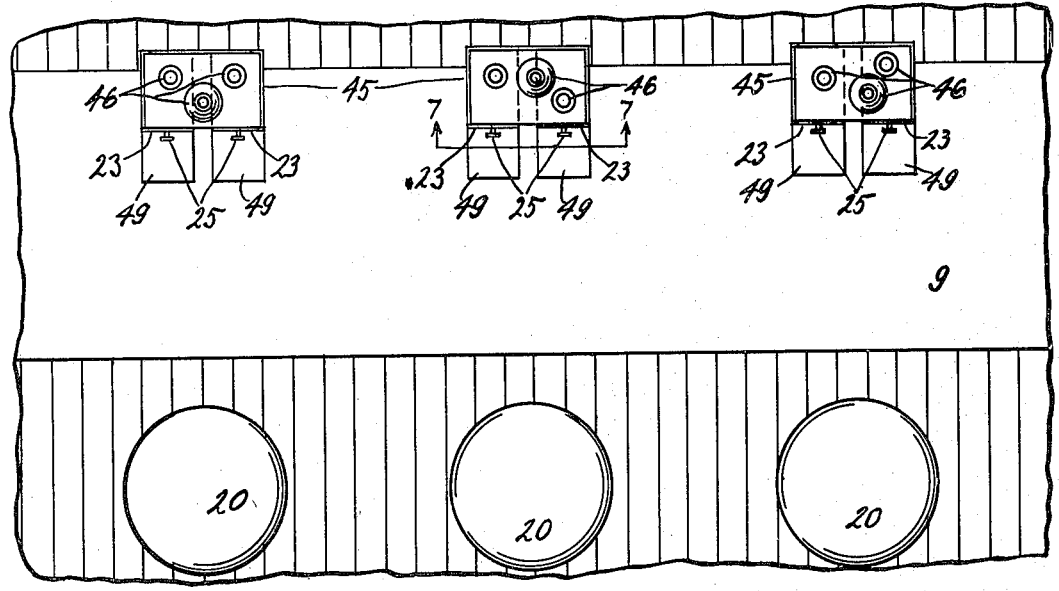
Fig. 4 is a top view of a portion of a restaurant including part of a lunch counter and a number of my devices installed thereon, the latter in this case being shown in what may be termed double units and including some modifications.

Referring to the drawing by reference numerals, 9 is a restaurant lunch counter having a rear longitudinally arranged strengthening board $9^a$. My device consists of a vertically arranged magazine 10, preferably rectangular in cross section and having angle clips 11 with perforations so arranged that the magazine may be secured to the counter board $9^a$ by screws 12 in such a manner that almost the entire magazine is below the level of counter 9, that portion of it above the counter comprising an integral horizontal head 13 containing the main working parts of the device. 10 is a door on the rear side of the magazine.

The magazine is provided with a vertically slidable plunger 14 (see Fig. 2) a compression coil spring 15 placed between the punger and the bottom $10^b$ of the magazine tending at all times to push the plunger upwardly. A chain 16 secured as at $16^a$ to the plunger 14 is passed through an aperture 17 in the bottom and is used to draw the plunger down so that sliced bread 18 may be placed on top of it. When the pull on the chain is released the spring 15 causes the plunger to press upwardly against the vertical tier of bread slices. The topmost slice $18^a$ is pressed against a grate 19 mounted horizontally within the head 13. The bread within the magazine is thus normally under compression between the plunger 14 and the grate 19.

As previously stated the main working parts are incorporated in the head 13 and consist of manually regulated means for extracting a certain number of bread slices from the device by each customer. For convenience the walls of the head 13 will be referred to as $13^f$, $13^r$ and $13^s$ for front, rear and side walls respectively it being understood that $13^f$ is the exposed front wall of the device facing the customer sitting on a stool 20 in front of counter 9. The bread extracting means are operated by the customer but regulated by the attendant behind the counter and consists of the following mechanism:

The wall $13^f$ is provided with an upper horizontal, narrow slot 21, a wider slot 22 spaced below the slot 21 and both slots normally covered by a rectangular plate 23 having an integral, horizontally arranged plate or slide $23^a$ extending through slot 21 almost to the rear end or wall $13^r$ the said slide being guided between suitable guides 24 secured to the sides $13^s$. Plate 23 is provided with a suitable knob 25 for pulling the plate 23 and its slide $23^a$ outwardly to eject one slice of bread $18^a$ at a time through slot 22. The latter is accomplished by a transversely arranged row of depending fingers 26 secured on a rock shaft 27 pivotally mounted at 28 on the under side of slide $23^a$, said fingers 26 being spaced so that each one extends down through the opening between the bars of grate 19 (see Figs. 1, 5 and 6). Said fingers 26 are prevented from swinging back beyond a vertical line by an inverted yoke 29 suitably secured on slide $23^a$. Said slide has a rear notch $23^{aa}$ and one of said fingers has an upward projection $26^a$ projecting upwardly through said notch to engage a trip lever mechanism presently to be described. It will be readily understood that when a customer grasps knob 25 and pulls the slide toward him the fingers 26 will contact with the rear edge of the uppermost slice of bread 18$^a$ and push it outwardly through slot 22 so that it is expelled from the magazine and falls (as at 18$^{aa}$ in Fig. 2) upon the counter 9. The slide 23—23$^a$ is retracted to its original position by any suitable means such as light coil springs 30 secured with their front and rear ends respectively in plate 23 and the rear wall 13$^r$ (see Figs. 1, 2 and 5).

To limit the number of slices obtainable by any one customer I provide a trip lever and locking mechanism mounted in head 13. Said means consist of a transversely arranged crank shaft 31 journaled in the side walls 13$^s$ and having its crank portion 31$^a$ located directly above an elongated slot 23$^b$ in slide 23. An elongated vertically movable locking bar 32 is pivoted as at 33 to the rear wall 13$^r$ and rests with its front end on the crank 31$^a$, said front end of the bar being bent downwardly and back under the crank and thence upwardly to form a shoulder 32$^a$ and an elongated eye 32$^b$ within said bent portion (see Figs. 1, 5 and 6). Said bar 32$^a$ may also be simply a rigid arm projecting downwardly from the bar 32. One end of the shaft 31 protrudes through side 13$^s$ and part of it carries a pinion 34 adapted to be engaged by a toothed rack 35 slidable longitudinally in guides 36 secured on the outside of wall 13$^s$. Said rack has an outwardly projecting lip or lug 35$^a$ and the guides have two like, spaced lugs 36$^f$ and 36$^r$ located respectively forward and rearward of the crank shaft pinion, said lugs each having a perforation and all said perforations arranged linearly and adapted to be slidably engaged by a rod 37 the rear end of which terminates in a knob or button head 38. A fixed collar 39 is provided on rod 37 and is adapted to engage the rack lug 35$^a$ when the rod is pulled rearwardly, thereby moving the rack rearwardly and the rack in turn rotates the pinion 34 and crankshaft 31 in direction indicated by arrow 40 in Figs. 2 and 5. 41 (Fig. 2) is a stop block removably secured in the rear part of and between the guides 36. The length of said block of course determines the amount of rearward movement of the rack 35 and also the amount of rotation of crank shaft 31. On the latter shaft, to one side of its crank, and in the path of the finger 26$^a$ I provide a trip lever device consisting of a mutilated disk 42 on which are loosely pivoted a number of concentrically arranged fingers 43 (see Figs. 1 and 5). The lowest finger always hangs from its pivot in the path of member 26$^a$ of the bread expelling fingers 26 and is prevented from swinging forward by a shoulder 42$^a$ adjacent to it on the disk 42. Thus when the topmost slice of bread 18$^a$ is being pushed out of the device the member 26$^a$ contacts with the lowest disk finger 43, the latter is forced forwardly but must follow its circular path and is therefore raised until finger member 26$^a$ will pass by it. The rotary motion of the disk thus caused will of course turn the crank shaft 31 and also causes the next disk-finger to drop down into the path of finger 26$^a$. When the bread slice has been ejected the slide 23—23$^a$ is drawn back to its original position, its pivoted fingers 26 merely tipping up forwardly and riding on top of the uppermost slice of bread and then dropping down to vertical position back of said slice in readiness to repeat the operation.

In setting the device the attendant back of the counter pulls rack 35 back by pulling on knob 38 of bar 37 until the rack stops against block 41. The crank shaft and its pinion are so arranged that when the rack has been moved back the crank 31$^a$ is in an upward position, preferably inclined somewhat forwardly (see Figs. 1 and 5). As each bread slice is expelled from the machine the crank 31$^a$ makes a partial circular movement rearwardly (as arrows 40). These movements of course cause the rack 35 to be gradually moved forward and carry the bar 37 with it, and the successive movements cause the crank to be lowered to a vertically depending position close to opening 23$^{bb}$ in slide 23$^a$. When the latter position is reached by the crank the locking arm 32 resting on it naturally follows the downward movement of the crank until its eye portion 32$^b$ projects down through said opening 23$^b$ in the slide with its shoulder 32$^a$ adjacent the rear part of the opening. When this occurs the shoulder 32 locks the entire mechanism and no more bread can be extracted because the shoulder 32$^a$ prevents forward movement of the slide 23. The customer of course can get no more bread until the device has been re-set by the attendant, who simply pulls the bar rearwardly as above described and the locking bar 32 is raised.

In Figs. 1 and 2 the re-setting bar 37 is shown as a bifurcated member of which only one is shown in use, but it will be readily understood that the other member may be used for operating simultaneously a second bread dispensing device mounted adjacent the single one shown.

Figure 5:
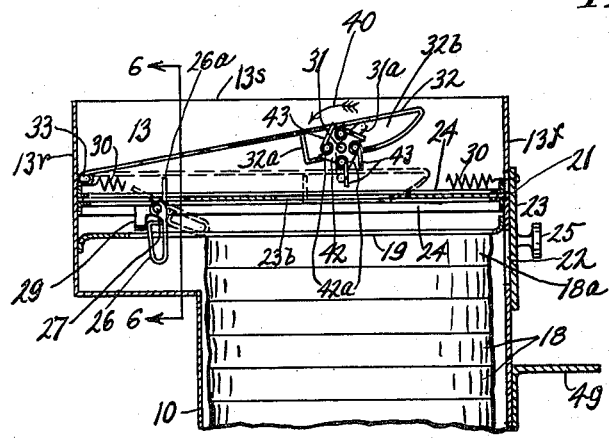
Fig. 5 is an enlarged sectional elevation as on lines 5—5 in Figs. 1 and 3.
Figure 6:
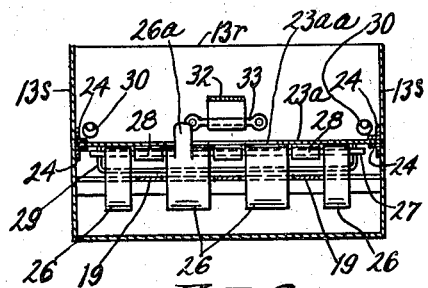
Fig. 6 is a sectional view on line 6—6 in Fig. 5.
Figure 7:
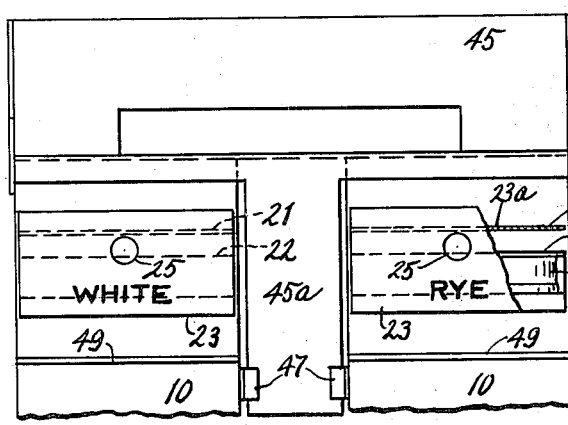
Fig. 7 is an enlarged sectional view of the double unit device as on line 7—7 in Fig. 4.
Figure 8:
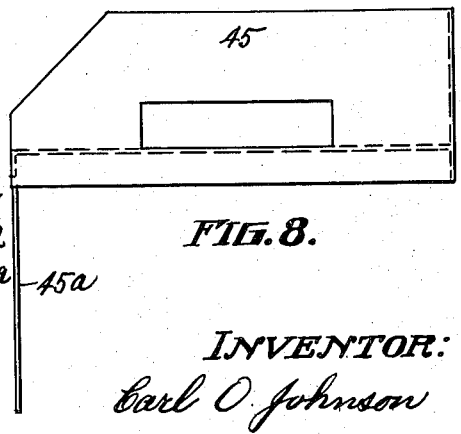
Fig. 8 is a side elevation of the tray adapted to cover a double unit device.

In Figs. 4, 5 and 7 such double units are shown, the magazines to contain different kinds of bread. These views also show a sheet metal tray 45 adapted to cover both magazines and provide a handy place for salt and pepper shakers, catsup bottles etc., indicated by 46 in Fig. 4. The tray may have a tongue 45$^a$ extending downwardly between the two magazines and be frictionally held between suitable clips 47 secured on adjacent walls of the magazines.

49 is a suitable horizontal plate extension attached to the front wall of the magazine (as in Fig. 5) and on which the bread slices are dropped as they come out of the device. Said plate may be imbedded in the counter 9 flush with the surface of the latter.

What I claim is:

1. In a bread dispensing device a vertically arranged magazine adapted to receive a tier of bread slices, an ejecting chamber in the upper portion of said magazine, an ejector slide in said chamber having a row of rocking members normally depending from their pivots and adapted to engage and eject a slice of bread through an aperture in the chamber, a finger on one of said rocking members arranged to engage a tripping mechanism, controlling the number of ejections, each time a slice of bread is ejected, and means for retracting the ejector slide after each ejecting movement, the rocking members adapted to tilt one way only to allow them to ride over the top slice of bread in the magazine and thence drop down to vertical position adjacent one side of said slice in position to engage and eject said slice.

2. The structure specified in claim 1, in which said tripping mechanism comprises a crank shaft arranged horizontally above the ejector slide, means mounted on said shaft and adapted to be engaged by the upright finger of the ejector member to partly rotate said crank shaft during each ejecting movement, a pivoted bar resting with its free end on the crank of said shaft and movable in a vertical plane according to the movement of said crank, a downwardly projecting fixed arm on said bar normally above the path of the ejector but positioned to engage the ejector slide when the crank is down in its lowest position, to lock the ejector in closed position, and means for releasing said ejector slide from its locked position.

3. The structure specified in claim 1, in which said tripping mechanism comprises a crank shaft arranged horizontally above the ejector slide, means mounted on said shaft and adapted to be engaged by the upright finger of the ejector member to partly rotate said crank shaft during each ejecting movement, a pivoted bar resting with its free end on the crank of said shaft and movable in a vertical plane according to the movement of said crank, a downwardly projecting fixed arm on said bar normally above the path of the ejector but positioned to engage the ejector slide when the crank is down in its lowest position, to lock the ejector in closed position, and means for releasing said ejector slide from its locked position, said releasing means comprising a toothed rack slidable in a plane coinciding with the movement of the ejector slide, a pinion on the crank shaft and meshing with said rack, a manually operated rod secured to said rack to pull the latter in a horizontal plane and revolve the crank shaft until the crank and the locking bar arm are raised out of the locked position.

In testimony whereof I affix my signature.

CARL O. JOHNSON.